United States Patent
Foster

(10) Patent No.: US 6,351,201 B1
(45) Date of Patent: Feb. 26, 2002

(54) MICROELECTROMECHANICAL SWITCH WITH BRAKING ALGORITHM

(75) Inventor: John Stuart Foster, Santa Barbara, CA (US)

(73) Assignee: Innovative Micro Technology, Goleta, CA (US)

( * ) Notice: Subject to any disclaimer, the term of this patent is extended or adjusted under 35 U.S.C. 154(b) by 0 days.

(21) Appl. No.: 09/825,760

(22) Filed: Apr. 3, 2001

Related U.S. Application Data

(63) Continuation-in-part of application No. 09/764,919, filed on Jan. 17, 2001.

(51) Int. Cl.$^7$ ................................................. H01F 7/08
(52) U.S. Cl. ...................... 335/220; 335/270; 335/271; 335/274; 257/421
(58) Field of Search .................. 335/220, 78, 270–276; 257/414, 415, 421

Primary Examiner—Ramon M. Barrera

(57) ABSTRACT

A micromechanical switch having a plurality of stable positions, which can be driven between the stable positions with a minimum of residual oscillation. The low oscillation results from the application of a braking force of specific magnitude and duration to exactly cancel the excess energy imparted to the switch during actuation. The braking algorithm results in a faster settling time, thereby improving the performance of the switch.

17 Claims, 8 Drawing Sheets

MICROELECTROMECHANICAL SWITCH WITH BRAKING ALGORITHM

This application is a continuation-in-part of U.S. application Ser. 09/764919, filed Jan. 17, 2001.

FIELD OF THE INVENTION

This invention relates to the control of microelectromechanical switches.

BACKGROUND OF THE INVENTION

High speed, high precision switching devices are becoming required for a wide variety of applications. In optical communications for example, information is encoded in a modulated beam of light and transmitted via fiber optics. The encoded information is routed to the appropriate destination by a network of opto-electronic switches, which convert the light into electrical signals in order to direct the flow using standard electronic devices.

There is a need in this technology to replace opto-electronic switching mechanisms with all-optical devices. All-optical switching avoids the conversion losses and complexities associated with the transduction of the laser light into electrical signals, resulting in an overall improvement in the performance parameters of the information system.

In an all-optical switch, an optical element steers a laser beam from one of a plurality of input fibers, to one of a plurality of output fibers. The optical element may be a millimeter-sized mirror or grating, mounted on a microactuator. The microactuator may extend the element into the path of the beam to intercept it, or it may rotate the element to redirect the beam, or it may retract the element to allow the beam to pass. Arrays of optical elements may be individually mounted on corresponding arrays of microactuators, to handle N×M fabric switches which direct light from N input fibers to M output fibers. To achieve acceptable performance, these microactuators may be required for the actuator to operate on millisecond time scales, and with micro-radian accuracy.

For optical communications as well as other applications, cost, power, speed and accuracy requirements have motivated the development of microscopic actuators using photolithographic techniques. These devices are known as microelectromechanical systems, or MEMS. Because of their small size, MEMS switches generally have high precision, low inertia and low power requirements. Batch fabrication techniques may also make MEMS a low cost approach to switching arrays.

Micromechanical switches such as those proposed for optical telecommunications generally have a member or armature driven between a plurality of mechanically stable states. That is, the system has a number of positions in which the driven member can reside in equilibrium, in the absence of a driving force. Frequently, the system is bistable, i.e. there are two positions in which the driven member can reside in equilibrium. In the example of the optical switch, the two states might be with the optical element "extended" or "retracted". In the case of an electrical switch the two states might be "off" or "on". In the case of a valve, the two states might be "open" or "shut". An energy barrier, generally created by springs, cams and/or mechanical detentes, separates the equilibrium positions. The job of the actuator is to shift the driven member over the energy barrier between these states, within a prescribed switching time. An example of such a bistable magnetostatic microactuator is found in the co-pending parent application, U.S. patent application Ser. No. 09/764919, filed Jan. 17, 2001.

However the use of springs in these systems also creates the possibility of oscillation about the equilibrium position. In general, the switch is not useable until a minimum vibration or residual motion is reached. This settling time can add significant delays to the system performance. Settling time can be improved at a cost, by adding viscous or dispersive mechanisms to damp out vibration, or by adding active feedback control to the actuation device. Either choice carries a significant burden in terms of cost, complexity and power consumption. Therefore, a problem remains with micromechanical switches, in that settling time may be a primary limitation on the device performance and suitability for a given application.

BRIEF DESCRIPTION OF THE DRAWINGS

The present invention will be understood more fully from the following detailed description, and from the accompanying drawings, which however, should not be taken to limit the invention to the specific embodiments shown but are for explanation and understanding only.

DETAILED DESCRIPTION

Figure 1:
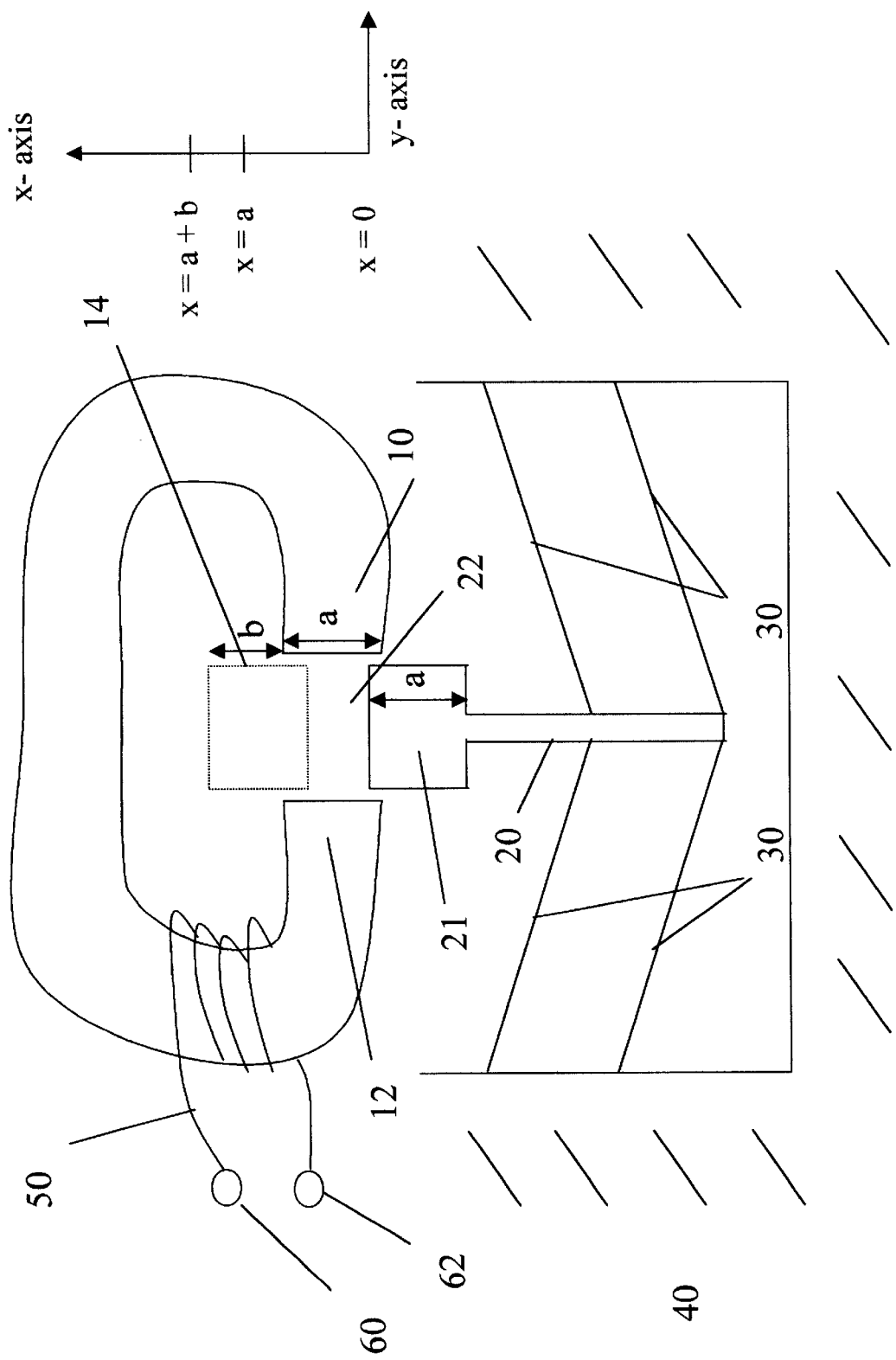
FIG. 1 is a simplified schematic of a bistable magnetostatic micromechanical switch.

A bistable microactuator switch is set forth, in which the switch is driven between the two equilibrium positions with low residual oscillation. FIG. 1 shows a first embodiment of the bistable switch, in which the actuation means is magnetostatic. The driven member is a plunger 20, to which a slug of magnetic material 21 is affixed. The material may be permanently magnetized, such as CoSm, or it may be of a permeable material for example NiFe. Also shown is a second structure of permeable magnetic material, adjacent to the plunger, and formed in a circuit. Such a structure is known as a magnetic "core". The magnetic core includes a discontinuity 22, known as a magnetic "gap", which straddles the plunger 20. The dimensions of the slug and plunger are so designed as to allow the slug to pass through the gap 22 in the permeable core 12.

The permeable core can be magnetized by driving a current through a helical coil 50, which is wound around a portion of the core. The magnetic field created by the current in the coil induces a parallel magnetization in the permeable core, and this magnetization circulates around the core to the gap 22. The gap then acts as a pair of magnetic north/south pole faces, across which a magnetic field exists and interacts with the magnetic slug affixed to the plunger. This interaction results in a force acting on the plunger. In the case of the slug magnetic material being magnetically permeable, the force that results always urges the plunger to be centered in gap 22. The coil may be driven by connecting a voltage source or a current source across input terminals 60 and 62. This core/gap arrangement is found in many applications and is known generally as a magnetostatic actuator.

The plunger is capable of movement along the vertical axis (denoted the x-axis in the figure) within a range defined by a set of springs 30. The springs hingedly attach the plunger to a fixed substrate 40, where the term "hingedly" is used to connote rectilinear, constrained motion along the x-axis. The springs exert a linear restoring force over the operating range of motion, essentially from x=0 to x=a+b. The restoring force is proportional to the deflection x of the plunger from its starting position at x=0. It is noted that the starting position is the equilibrium balance between the springs and the magnetostatic interaction between the magnetic slug and the gap field. In the discussion to follow, the plunger and magnetic slug are treated as simply a mass affixed to a stationary point by massless springs. In the discussion, the bistable magnetostatic switch is an embodiment of a general mass/spring system, and the concepts presented can be applied to other similar systems, which can be modeled as mass/spring systems.

A second equilibrium position exists for the plunger at x=a+b. This equilibrium position arises from a second symmetric spring orientation, in which the spring deflection is nearly equal but opposite in angle to that shown in the figure. An inflection point occurs at x=a, and may be accommodated by a compliant segment in the spring which allows flexion in the y-direction. Numerous design choices exist for this feature, such as those described in the parent application, and for simplicity such features are not shown in the diagram; for illustrative purposes the springs are drawn simply as monolithic hinges. The second equilibrium position of the plunger exists at x=a+b, and is shown as the dotted outline 14. This distance, from x=0 to x=a+b, represents the full stroke of the switch.

Figure 2:
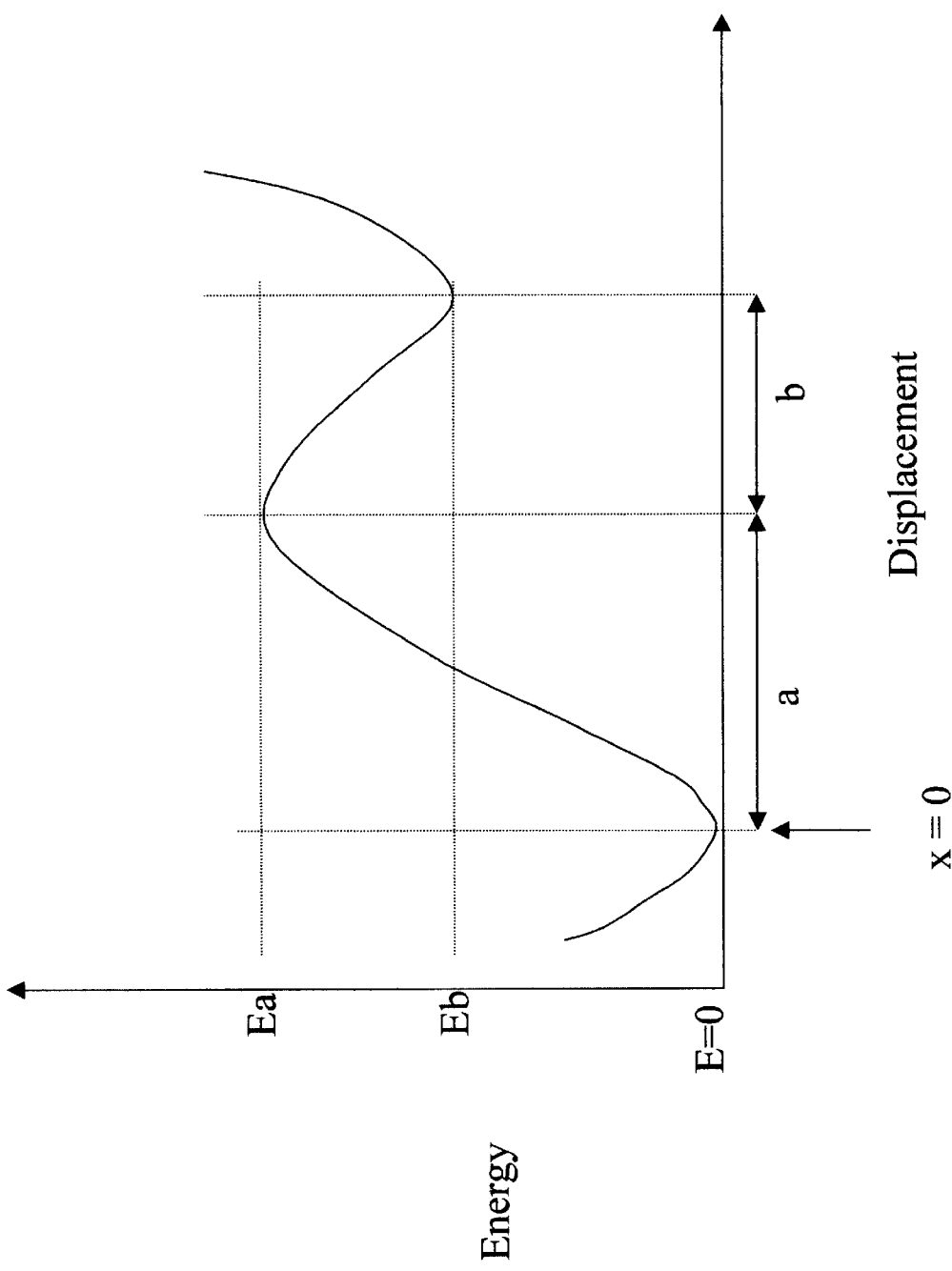
FIG. 2 is an energy diagram of the bistable micromechanical switch.

The assumed energy diagram is shown qualitatively in FIG. 2. The two equilibrium positions are located at x=0 and x=a+b. These points correspond to the retracted and extended positions of the optical element in the optical telecommunications application. The plunger 20 may stably reside in either position upon cessation of driving forces. The first energy minimum occurs at x=0, as shown in the figure, and the second at x=a+b.

An energy barrier exists between the equilibrium positions, peaking at displacement x=a. In order to move the element between minima x=0 and x=a+b, an energy $E_a$ must be applied to the mass to overcome the energy barrier. The energy delivered into the system by the actuation force $F_a$ is given by the integral of the force with respect to the distance x over which it acts: $\int F_a dx = E_a + \frac{1}{2}*m*V_a*V_a$, in which $V_a$ is the velocity of the mass at x=a.

Since the barrier energy $E_a$ is greater than the energy of the second equilibrium $E_b$, the mass will accelerate toward, and overshoot the endpoint point x=a+b. Oscillation about the endpoint x=a+b will persist until friction or viscous effects absorb the excess energy. An element of this invention lies in the application of a braking force $F_b$, which is chosen to have a specific magnitude and duration so as to bring the mass to a complete stop at the top-dead-center of the second equilibrium point, with little or no residual oscillation. The application of a properly chosen braking force, for the correct duration of time, results in minimum oscillation of the member in its target state. The selection criteria for these values are a primary goal of this disclosure.

It should be appreciated by those skilled in the art, that a useful feature of magnetostatic switches is that the force applied to the plunger reverses sign at a point along the stroke between equilibrium positions. In fact, for the embodiment of FIG. 1, the sign of the force changes from positive to negative at the height of the energy barrier at x=a. The situation is shown diagrammatically in FIG. 3a. The constant force (with inflection point) profile results from a constant input voltage waveform, shown in FIG. 3b, applied across input terminals 60 and 62. Therefore in this particularly simple embodiment, the same actuation means may be used to provide both the accelerating force and the braking force, with a constant input voltage through the stroke of the switch. Similar embodiments of the magnetostatic switch may exist in which a constant current waveform may be used. The concepts however are generally applicable to other types of switches, as long as a braking force can be applied to the device, according to the design principles disclosed here.

A first criterion applies to the mechanical design of the switch itself: The location of the energy barrier is not equidistant between the two equilibrium positions. For the case shown in FIG. 1, the dimension a, which is the characteristic dimension of the magnetic tab and the magnetic gap, is designed to be greater than the extent of additional throw, i.e. a>b. A second criteria is that the quantity $E_b*a/(a-b)$ must be greater than $E_a$.

A third criteria is that the braking force applied from x=a to x=a+b, be substantially equal to the quantity $F_b=E_b*a/(a-b)$. Applying a braking force of this magnitude results in the removal of energy from the system given by the integral of the force with respect to the distance over which it is applied: $\int F_b dx = E_a - E_b + \frac{1}{2}*m*V_a*V_a$, where the integral is taken over x from a to a+b. For the values chosen, this integral will cancel the energy delivered to the system during the actuation phase. As a result, the element or mass is delivered to the second equilibrium position at x=a+b, with zero excess energy and therefore zero velocity. The duration of time over which the force is exerted is the transit time, as the element traverses x=a to x=a+b. The plunger is delivered to the top-dead-center of the second equilibrium position with little or no additional settling time required.

Figure 3:
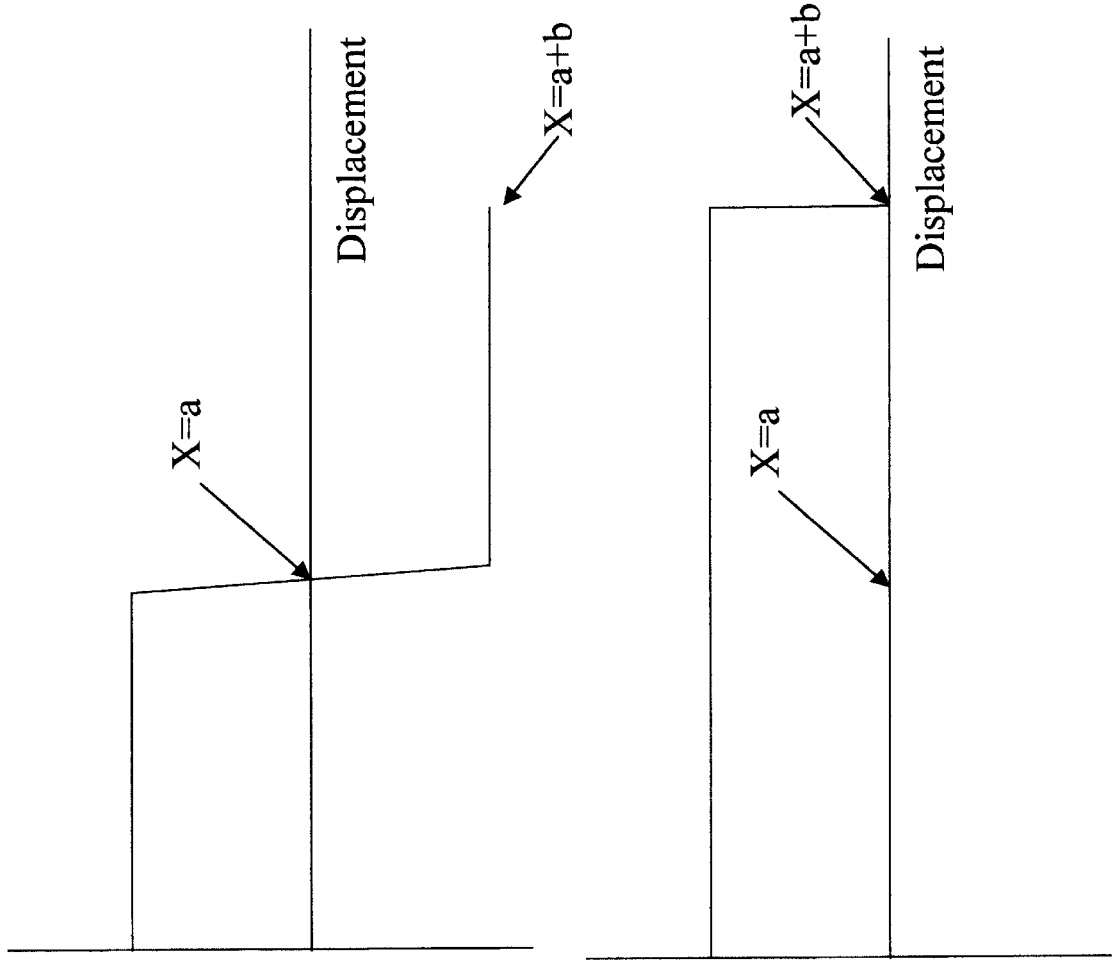
FIG. 3a is a force versus displacement diagram for a bistable magnetostatic micromechanical switch.
FIG. 3b is a voltage versus displacement diagram for a bistable magnetostatic micromechanical switch.
Figure 4:
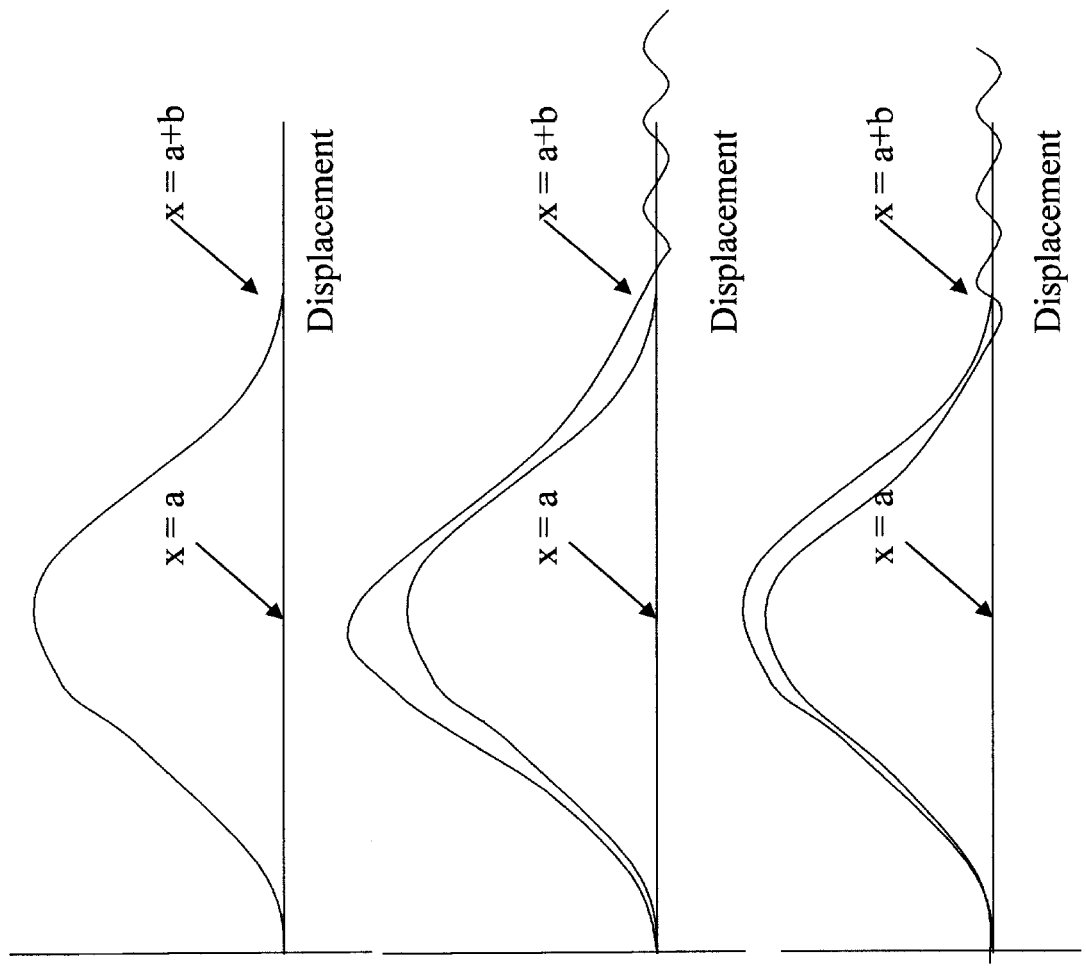
FIG. 4a is a velocity versus displacement profile for the bistable switch, according to this invention.
FIG. 4b is the velocity versus displacement profile for the case in which excessive force is used.
FIG. 4c is the velocity versus displacement profile for the case in which insufficient force is used.

FIG. 4a is an illustrative diagram of velocity versus displacement as the switch is driven from x=0 to x=a+b, and corresponding to the force versus displacement curve of FIG. 3.The positive force accelerates the element from x=0 to x=a, at which point it reaches its maximum velocity. At x=a, the force changes sign, and the element decelerates. The decrease in velocity is shown in FIG. 4a, as the element comes to a complete stop at x=a+b. Other values of the force other than $F_b$ may not result in this desired behavior. FIG. 4b for example, shows the case in which the applied force is less than the critical value needed according to this invention, $F_b$. As can be seen in the figure, the braking energy is insufficient and the element is drawn by the restoring force toward x=a+b. The element overshoots the endpoint and oscillates about the endpoint x=a+b, which deleteriously affects the settling time of the switch. In FIG. 4c, the applied force is greater than the critical value needed, imparting the plunger with excess energy and oscillation about the endpoint. An important result disclosed here, is that the proper value of the braking force must be used to minimize residual oscillation; the application of a force with more or less than the proper value cannot be compensated by altering the length of time that the force is applied.

The switch operates similarly in the reverse direction, i.e. when the plunger is actuated from the second equilibrium point at x=a+b, back through the energy maximum at x=a, to x=0. This reverse operation is fully analogous to the forward operation, and the plunger is delivered to top-dead-center of its original position at x=0. The braking force required from x=a to x=0 is again ideally $F_b=E_b*a/(a-b)$.

To determine the correct braking force $F_b$, the system characteristics may need to be determined empirically, by measuring the force on the element as a function of input current to the coil 50, or input voltage. Alternatively for sufficiently simple and reproducible systems, a finite element analysis or other calculation may yield acceptable values for the braking force $F_b$.

Figure 5:
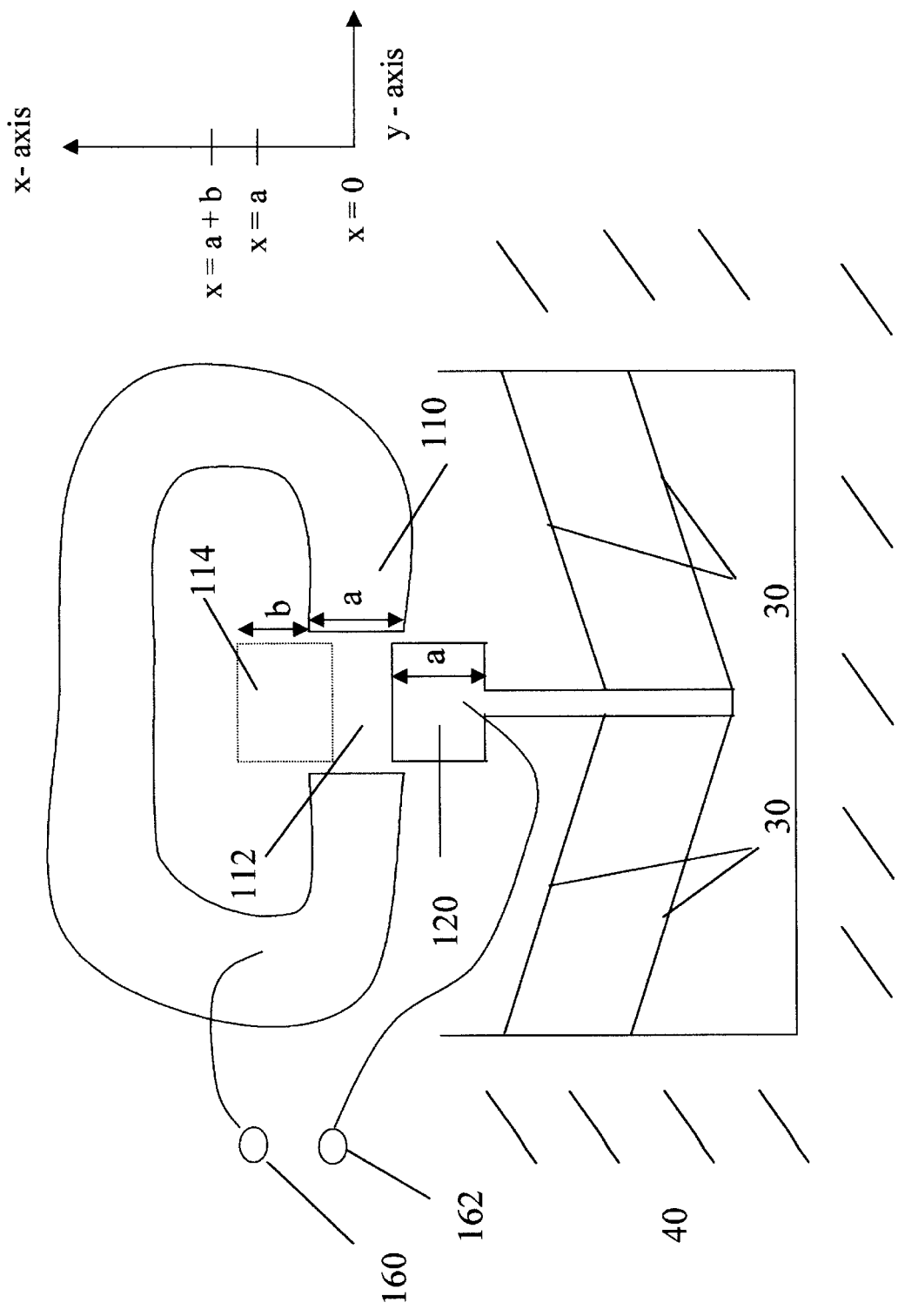
FIG. 5 is an embodiment of a bistable electrostatic switch.
Figure 6:
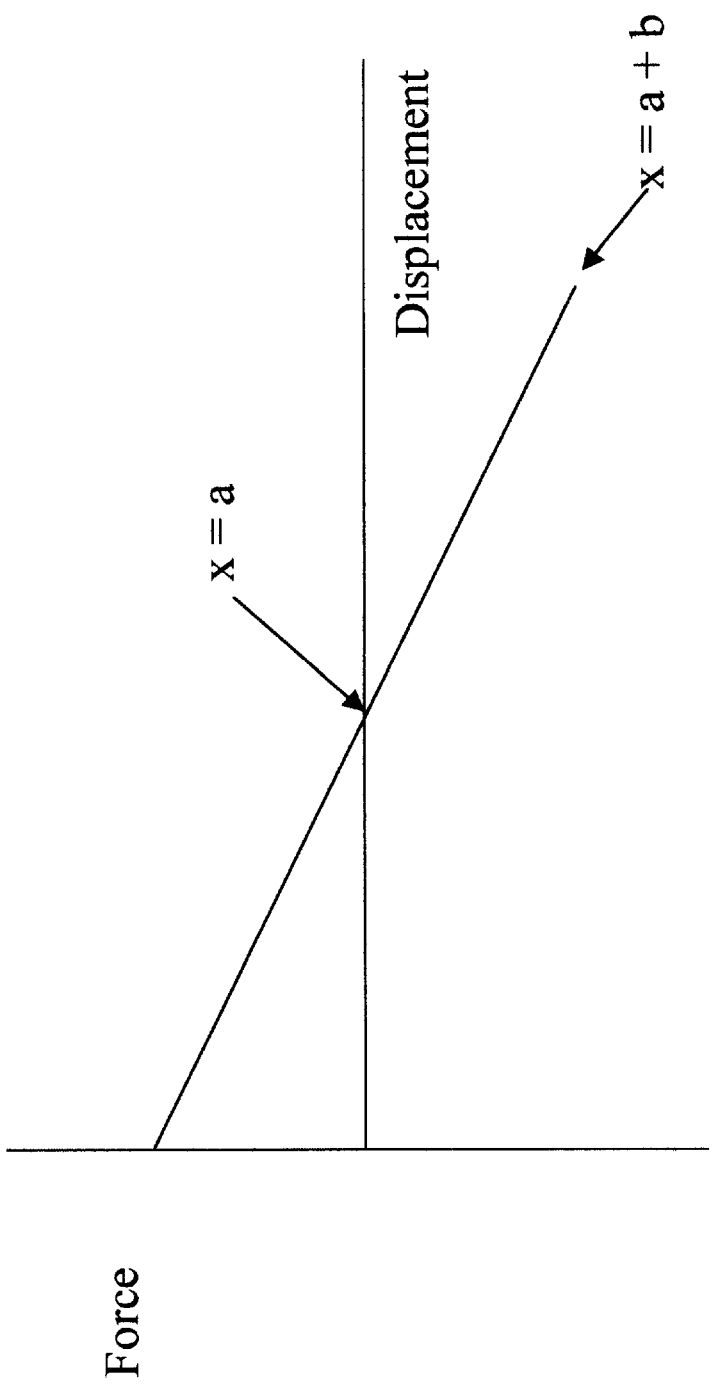
FIG. 6 is a simplified force-versus-displacement diagram for the bistable electrostatic switch.

These design guidelines result from the fact that the force is constant with displacement in the embodiment. However, this behavior is characteristic of many bistable switching systems, so that this invention is applicable over a broad range of devices. In another embodiment for example, a bistable switch can be fabricated in which electrostatic interactions are used as the actuation means. An exemplary device is shown in FIG. 5, which depicts a first electrode 110 interacting with a second electrode 120. The electrodes may be made of any suitable conducting or semiconducting material, such as Cu, Al, Si, Ge, or GaAs.

The first electrode is a plunger, hingedly mounted to the substrate 40 via a set of monolithic hinges 30. The second electrode is formed in a ring shape and includes a discontinuity 112, which straddles the plunger. The discontinuity, or "gap" 112, is dimensioned so as to admit the plunger 120.

Each face of the gap is charged to a differential voltage with respect to the plunger, by application of a voltage across terminals 160 and 162. Electrostatic interaction of the conductive plunger with the ring electrode will produce an attraction or repulsion of the plunger into or out of the gap, depending on the sign of the differential voltage. This arrangement of electrodes is found in many applications and is known generally as an electrostatic switch or actuator.

The plunger is capable of moving along the vertical axis (denoted the x-axis in the figure) within a range constrained by the set of springs 30. The springs exert a linear restoring force over the operating range of motion, essentially from x=0 to x=a+b. The restoring force is proportional to the deflection x of the plunger from its starting position at x=0. It is noted that the starting position is the equilibrium balance between the springs and the electrostatic interaction between the conducting plunger and the ring electrode, if the electrodes are energized in their normal operating mode.

A second equilibrium position exists for the plunger at x=a+b. This equilibrium position arises from a second symmetric spring orientation, in which the spring deflection is equal but opposite that shown in the figure. The second equilibrium position of the plunger is shown as the dotted outline 114.

A first design criterion for the bistable switch is that the dimension a must be greater than b. This requirement is in full analogy to the magnetostatic case, and the energy diagram is qualitatively the same as that shown for the magnetostatic case in FIG. 2. The system has two stable equilibrium points, the first at x=0 and the second at x=a+b. Electrostatic interaction between the plunger and the ring electrode delivers the force required to actuate the plunger between the two stable positions. As in the magnetostatic case, the force reverses sign at x=a, such that the same actuations means is capable of delivering the braking force as well as the accelerating force.

To minimize residual vibration, a braking force is applied to the plunger to decelerate the motion from x=a to x=a+b. The preferred value for the force is given by $F_b=E_b/(a-b)$, where $F_b$ is the braking force and $E_b$ is he energy at x=a+b.

Another embodiment of the invention is a bistable switch in which the actuation force is linearly proportional to the displacement. In this case the second equilibrium can also be accessed with minimum residual vibration, by setting the braking force to be $F_a*a-F_b*b=2*E_b$, where $F_a$ is the maximum actuation force and $F_b$ is the maximum braking force. In the case where $F_a=F_b$, then $F=F_a=F_b=2*E_b/(a-b)$, which is similar to the result above using a constant force with distance. For these relationships to be valid, the switch must again be designed such that a>b.

In the more general case where $F_a$ is not equal to $F_b$, we define $F_b$ to be 0 at x=a, and the force at x=0 is chosen to be equal to the force at x=a+b multiplied by the ratio a/b. In this case the three design criteria become: a>b; $E_b*(a/(a-b*b/a))>E_a$; $F_b(x=0)=2*E_b/(a-b*b/a)$. The force varies across the stroke of the switch according to this relationship, in order to bring the mass to rest at top-dead-center of the target equilibrium point.

Figure 8:
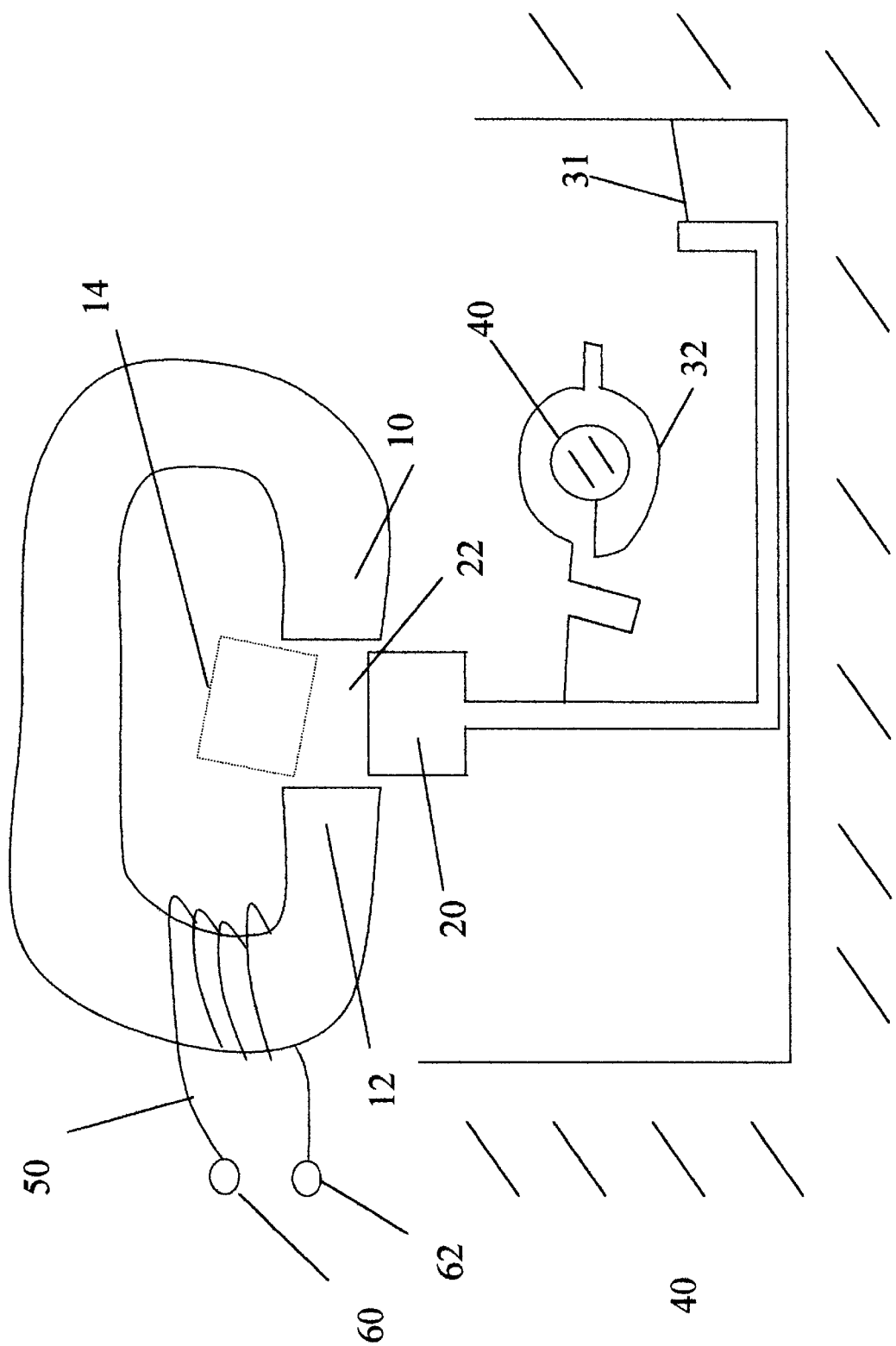
FIG. 8 is a simplified schematic of a bistable magnetostatic micromechanical switch with a rotary actuator.

While general design guidelines are presented for idealized mass/spring embodiments, it will be appreciated by those skilled in the art that a complex set of spring forces and masses may be present in a given application. It should also be clear that the invention may also be applied to systems in which the motion is not purely rectilinear, such as rotary switches in which the driven member is pivotably mounted to a stationary substrate. Such a rotary system is shown in FIG. 8. Plunger 20 is capable of rotary movement defined by springs 31 and 32. These springs attach to a fixed substrate 40 as shown in the Figure. The rotation of the Plunger is generally about a point near where spring 31 meets fixed substrate 40. There are two equilibrium positions, analogous to the two equilibrium positions of FIG. 1. The first equilibrium position is at θ=0. The inflection point arises at θ=θ$_a$ as the compression of spring 31 occurs during rotation. Further rotation allows a decompression of spring 31 with the resulting second equilibrium position at θ=θ$_a$+θ$_b$. Numerous design choices exist for this feature, such as those described in the parent application, and for simplicity such features are not shown in the diagram.

Further embodiments exist wherein the braking means is independent of the accelerating means. In each of these cases, an analysis similar to that described herein may be applied to yield an optimum value for the braking force, without departing from the spirit and scope of this invention.

In addition, deviations from the intended design may also exist, resulting from variability in materials and dimensioning tolerances. In such situations, an alternative approach to the implementation of this invention is to measure empirically the energy barrier between the equilibrium points, and the forces arising from a given application of current or voltage, and tune the braking force accordingly. In yet another embodiment, one may define an operating range for the braking force in such situations, for example from $0.7F_b$ to $1.3F_b$, or according to a tolerance budget analysis for the application. While the performance of such a system may not be optimum, it may be acceptable for certain applications, and superior to other approaches such as viscous damping or servo control.

Figure 7:
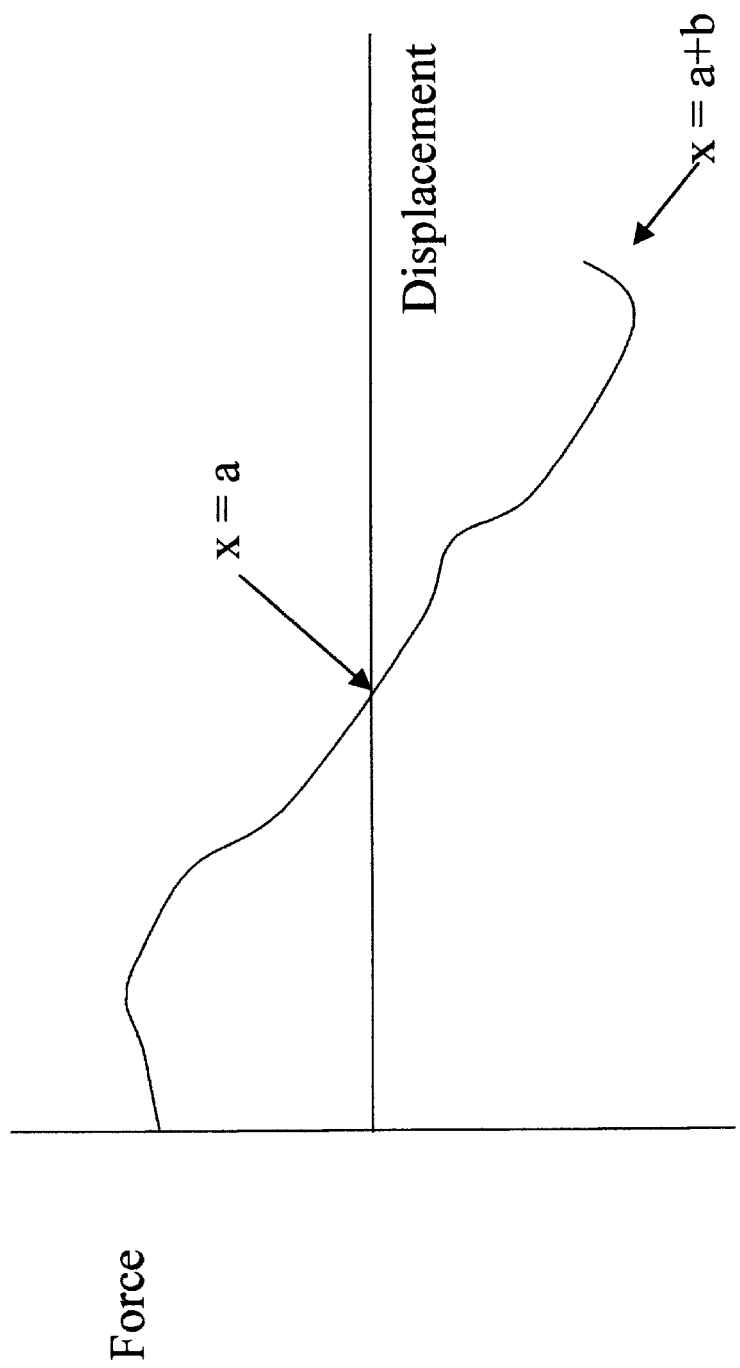
FIG. 7 is a generalized force versus displacement diagram for a bistable switch.

Furthermore, the force may not be a smooth or simple function of displacement. A generalized force profile is shown conceptually in FIG. 7, in which the profile is given an arbitrary shape for the purposes of illustration. The invention is applicable to systems with complex force versus energy profiles, as long as a, b, $E_a$ and $E_b$ can be chosen according to these design criteria: (1) a is greater than b; (2) $E_b*(a/(a-b))$ is greater than $E_a$; and (3) the braking force $F_b$ is related to $E_b/(a-b)$, and applied during the portion of the stroke x=a to x=a+b when switching from x=0, and applied during the portion of the stroke x=a to x=0 when switching from x=a+b.

While the invention has been particularly described and illustrated with reference to a preferred embodiment, it will be understood by those skilled in the art that changes in the description and illustrations may be made with respect to form and detail without departing from the spirit and scope of the invention. For example the electrostatic and magnetostatic forces may be manipulated by choice of film thicknesses and material composition. Spring constants may be varied by changing the aspect ratio of the beams or stiffnesses of the hinges. Accordingly, the present invention is to be considered as encompassing all modifications and variations coming within the scope defined by the following claims.

I claim:

1. A bistable micromechanical switch comprising:
   a substrate;
   a driven member hingedly mounted to said substrate by one or more springs, and moving in a direction of motion along an x-axis;
   an actuation means fabricated on said substrate and interacting with said hingedly mounted driven member to actuate said member from a first equilibrium position at x=0 through an intermediate location x=a to a second equilibrium position x=a+b, with said switch designed such that a>b, and in which:
      said intermediate location at x=a can be characterized by an energy $E_a$ relative to the first equilibrium location x=0;
      said second equilibrium position at x=a+b can be characterized by an energy $E_b$ relative to the first equilibrium location at x=0, such that that the quantity $E_b*(a/(a-b))$ is greater than $E_a$; and
      said actuation means applies a braking force $F_b$ between positions x=a to x=a+b, wherein $F_b$ is of a magnitude $E_b/(a-b)$.

2. The micromechanical switch of claim 1, wherein a constant voltage is applied to the actuation means from x=0 to x=a+b.

3. The micromechanical switch of claim 1, wherein the actuation means interacts with said hingedly mounted member via magnetostatic forces.

4. The micromechanical switch of claim 3, wherein the actuation means comprises a magnetic core with a current-carrying coil wound about said magnetic core.

5. The micromechanical switch of claim 4, wherein the hingedly mounted member comprises a plunger with a magnetic portion, which interacts with the magnetic core.

6. The micromechanical switch of claim 5, further comprising a means whereby the current delivered to the current-carrying coil can be varied according to the position of the plunger.

7. The micromechanical switch of claim 5, wherein the current delivered to the current-carrying coil is constant from x=0 to x=a+b.

8. The micromechanical switch of claim 5, further comprising a means whereby the voltage delivered to the current-carrying coil can be varied according to the position of the plunger.

9. The micromechanical switch of claim 5, wherein the voltage delivered to the current-carrying coil is constant from x=0 to x=a+b.

10. The micromechanical switch of claim 1, wherein the actuation means interacts with said hingedly mounted member via electrostatic forces.

11. The micromechanical switch of claim 10, wherein the actuation means comprises an electrically conducting feature fabricated on said substrate and said hingedly mounted member comprises a plunger with an electrically conducting portion.

12. The micromechanical switch of claim 11, wherein the electrically conducting feature further comprises a gap wide enough to admit the electrically conducting portion of said plunger.

13. The micromechanical switch of claim 12, further comprising a means whereby the voltage delivered between the conducting portion of said plunger and the conducting feature fabricated on said substrate can be varied according to the position of the plunger.

14. The micromechanical switch of claim 12, wherein the voltage delivered between the conducting portion of said plunger and the conducting feature fabricated on said substrate is constant from x=0 to x=a+b.

15. A bistable micromechanical switch comprising:
    a substrate;
    a driven member rotatably mounted to said substrate by one or more springs, and moving in an azimuthal direction θ about an axis perpendicular to said substrate;
    an actuation means fabricated on said substrate and interacting with said rotatably mounted member to actuate said member from a first equilibrium position at θ=0 through an angle to a second equilibrium position at, said second equilibrium position being characterized by an energy $E_b$ with respect to said first equilibrium position, with said switch designed such that:
       an intermediate angle $θ=θ_a$ exists between the first equilibrium position and the second equilibrium position which can be characterized by an energy $E_a$ relative to the first equilibrium position;
       said second equilibrium position at $θ=θ_a+θ_b$ can be characterized by an energy $E_b$ relative to the first equilibrium location at θ=0, such that that the quantity $E_b*(θ_a/(θ_a-θ_b))$ is greater than $E_a$; and
    said actuation means applies a braking force $F_b$ between positions $θ=θ_a$ to $θ=θ_a+θ_b$, wherein $F_b$ is proportional to $E_b/(θ_a-θ_b)$.

16. A method of operating a micromechanical switch, said switch having a member hingedly mounted to a substrate by one or more springs, said member moving in a direction along an x-axis through points x=0, x=a, and x=a+b in which a>b,
    said member driven by interaction with an actuation means designed such that:
       the point x=a+b may be characterized by an energy $E_b<E_a$;
       the point x=a may be characterized by an energy $E_a<E_b*(a/(a-b))$;
    said method comprising the steps of:
       altering the force delivered to the switch as a function of the position of the switch from x=0 to x=a+b
       delivering an accelerating force to the switch such that the hingedly mounted member achieves the location x=a with energy $E_a$; and
       delivering a braking force to the switch of a magnitude $E_b/(a-b)$.

17. The method of claim 16, wherein the accelerating force and the braking force result from applying a constant input voltage to the switch from x=0 to x=a+b.

* * * * *